(12) United States Patent
Bates et al.

(10) Patent No.: US 8,577,043 B2
(45) Date of Patent: Nov. 5, 2013

(54) SYSTEM AND SERVICE TO FACILITATE ENCRYPTION IN DATA STORAGE DEVICES

(75) Inventors: Allen K. Bates, Tucson, AZ (US); Nhan X. Bui, Tucson, AZ (US); Brian G. Goodman, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 12/351,700

(22) Filed: Jan. 9, 2009

(65) Prior Publication Data

US 2010/0177901 A1 Jul. 15, 2010

(51) Int. Cl.
*H04L 9/08* (2006.01)
(52) U.S. Cl.
USPC .......................................... 380/278; 713/193
(58) Field of Classification Search
USPC ................................. 380/277–279
See application file for complete search history.

(56) References Cited

U.S. PATENT DOCUMENTS

| 5,265,164 | A | 11/1993 | Matyas et al. |
|---|---|---|---|
| 6,112,192 | A | 8/2000 | Capek |
| 6,981,149 | B1 | 12/2005 | Housley et al. |
| 7,035,410 | B1 | 4/2006 | Aiello et al. |
| 7,096,503 | B1 | 8/2006 | Magdych et al. |
| 7,213,268 | B2 | 5/2007 | Stelling et al. |
| 2002/0184527 | A1 | 12/2002 | Chun et al. |
| 2003/0135754 | A1 | 7/2003 | Chiu et al. |
| 2005/0108369 | A1 | 5/2005 | Sather et al. |
| 2005/0238172 | A1 | 10/2005 | Tamura |
| 2005/0251695 | A1 | 11/2005 | Jaquette et al. |
| 2006/0039566 | A1 | 2/2006 | Stark et al. |
| 2006/0122945 | A1 | 6/2006 | Ripberger et al. |
| 2007/0083899 | A1* | 4/2007 | Compton et al. ............... 725/87 |
| 2007/0103984 | A1* | 5/2007 | Kavuri et al. ............ 365/185.17 |
| 2007/0180239 | A1* | 8/2007 | Fujibayashi et al. .......... 713/165 |
| 2007/0299952 | A1* | 12/2007 | Goodman et al. ............ 709/223 |
| 2008/0063210 | A1 | 3/2008 | Goodman et al. |
| 2008/0066193 | A1* | 3/2008 | Hahn et al. ....................... 726/32 |
| 2008/0219449 | A1* | 9/2008 | Ball et al. ....................... 380/277 |
| 2008/0222604 | A1 | 9/2008 | Murphy |
| 2009/0129586 | A1 | 5/2009 | Miyazaki et al. |
| 2009/0138700 | A1 | 5/2009 | Miyazaki et al. |
| 2009/0175451 | A1* | 7/2009 | Greco et al. ................... 380/277 |
| 2009/0202080 | A1* | 8/2009 | Mizuno ........................ 380/279 |
| 2010/0103874 | A1 | 4/2010 | Vikberg |

OTHER PUBLICATIONS

MC Press Contributing Author, New IBM LTO 4 Tape Systems Are 50 Percent Faster than LTO 3, Apr. 24, 2007, pp. 1-5.
Computer Associates (CA), CA Encryption Key Manager r14.5, 2010, pp. 1-5.
Quantum, Encryption Key Management: A Technical White Paper, Oct. 2007, pp. 1-10.
Nist, Recommendation for Key Management - Part 2: Best Practices for Key Management Organization, Nov. 8, 2002, pp. 1-79.

* cited by examiner

*Primary Examiner* — Gilberto Barron, Jr.
*Assistant Examiner* — Abdulhakim Nobahar
(74) *Attorney, Agent, or Firm* — Dan Shifrin

(57) ABSTRACT

An encryption communications appliance provides data encryption management for a data storage library. The appliance is coupled to an encryption-capable storage device, a data storage library controller within the data storage library and with an encryption key manager (EKM). The encryption command communications appliance intercepts encryption key requests from the data storage device and transparently forwards the requests to the EKM. The appliance also forwards transparently communications between the library controller and the data storage device.

16 Claims, 6 Drawing Sheets

SYSTEM AND SERVICE TO FACILITATE ENCRYPTION IN DATA STORAGE DEVICES

RELATED APPLICATION DATA

The present application is related to commonly-assigned and co-pending U.S. application Ser. No. 12/351,666, entitled METHODS TO FACILITATE ENCRYPTION IN DATA STORAGE DEVICES, filed on the same date as the present application, which related application is hereby incorporated herein by reference in its entirety.

TECHNICAL FIELD

The present invention relates generally to automated data storage libraries and in particular, to the encryption of data stored or to be stored on removable media.

BACKGROUND ART

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to, magnetic media (such as magnetic tape or disks), optical media (such as optical tape or disks), holographic media (such as holographic tape, disks, cards, etc.), electronic media (such as PROM, EEPROM, flash PROM, MRAM, Compact Flash™, Smart Media™, Memory Stick™, Secure Digital™, Solid State Drives, etc.), or MEMS based media (such as IBM's Millipede). Typically, the data stored in automated data storage libraries is resident on data storage media that is contained within a cartridge, referred to as a data storage media cartridge. An example of a data storage media cartridge that is widely employed in automated data storage libraries for mass data storage is a magnetic tape cartridge, such as the IBM 3592 and Linear Tape Open (LTO) magnetic tape cartridges which can be used in the IBM TS3500 tape library. An example of an optical data storage media cartridge and library is the IBM 3996 optical library.

In addition to data storage media, automated data storage libraries typically contain one or more data storage drives that store data to, and/or retrieve data from, the data storage media. Transporting data storage media between data storage shelves and data storage drives is typically accomplished by one or more robot accessors (hereinafter termed "accessors"). Such accessors have grippers for physically retrieving the selected data storage media from the storage shelves within the automated data storage library and transport such media to the data storage drives by moving in the X and/or Y directions which are parallel to the plane of the storage shelves and data storage drives.

In many applications, it is important to ensure that data stored on removable media is secure. In addition to the inconvenience and expense of having to replicate, reconstruct or re-obtain data lost to theft, accidents, etc., there can be tremendous fallout, including legal liability, if confidential information is misappropriated.

Companies such as the IBM Corporation offer drive-level data encryption with the LTO-4 (linear tape open, generation 4) tape drive. OEM customers who market data storage libraries acquired from one vendor and encryption-capable storage drives from another vendor may have difficulty integrating the drives into the library in a quick and efficient manner. Documentation may be difficult to obtain and each library product introduces its own challenges which must be overcome.

SUMMARY OF THE INVENTION

The present invention provides an encryption communications appliance for managing data encryption for a data storage library and a data storage library in which an encryption communications appliance is incorporated. The appliance is coupled to an encryption-capable storage device, a data storage library controller within the data storage library and with an encryption key manager (EKM). The encryption command communications appliance intercepts encryption key requests from the data storage device and transparently forwards the requests to the EKM. The appliance also transparently forwards communications between the library controller and the data storage device.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
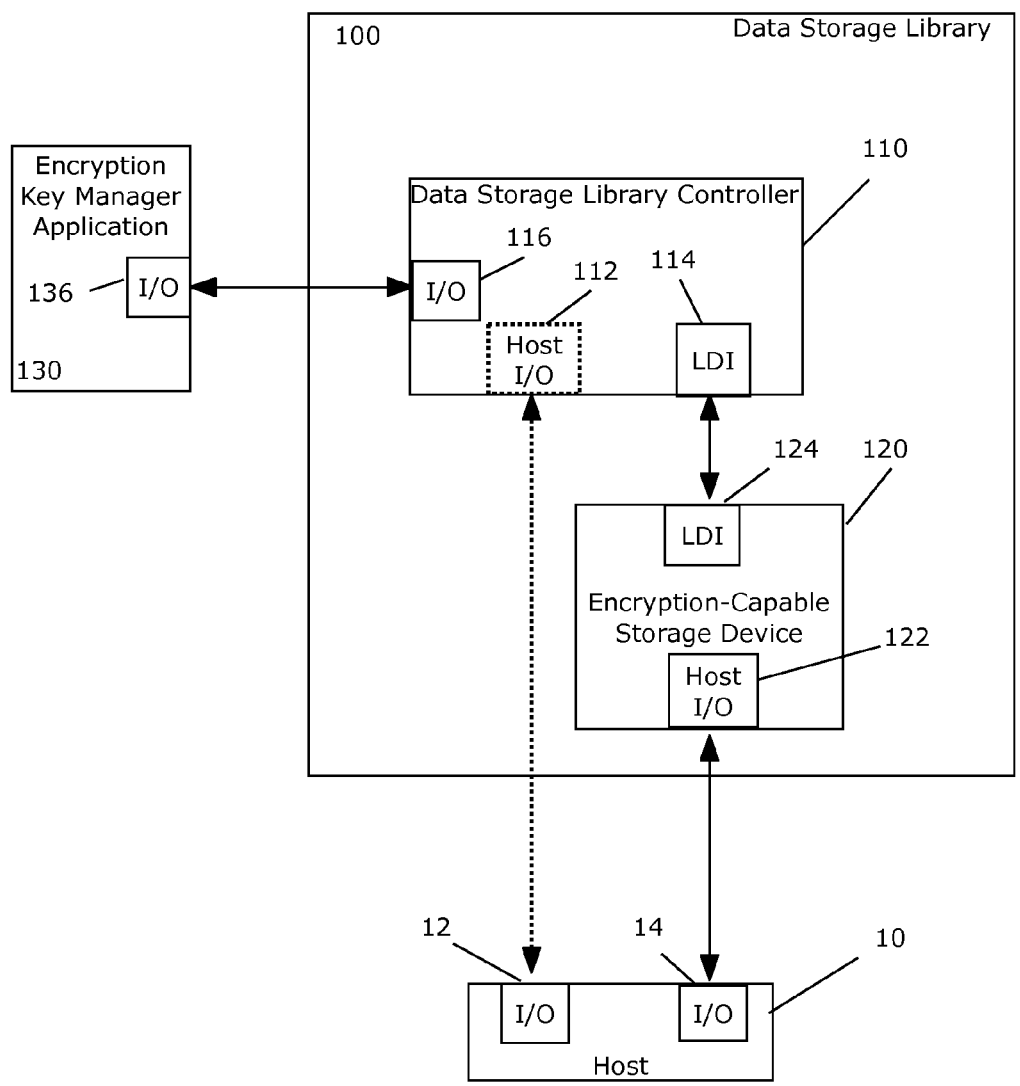
FIG. 1 is a block diagram of a prior art data storage library with an encryption-capable storage device and an encryption key manager.

FIG. 1 is a block diagram of a prior art data storage library 100 including a data storage library controller 110, an encryption-capable data storage device (also referred to herein as a "drive") 120 and an encryption key manager (EKM) 130. Operation of the components of the library 100 is well known and will not be detailed herein. Reference is made to U.S. patent application Ser. No. 11/470,670, filed Sep. 7, 2006 and entitled SELECTIVE ENCRYPTION OF DATA STORED ON REMOVABLE MEDIA IN AN AUTOMATED DATA STORAGE LIBRARY, incorporated herein by reference in its entirety, which includes one example of such details. In general, however, the library controller 110 directs the operation of the storage library 100 and is coupled to a host device 10 through a host interface 112 in controller 110 and interface 12 in the host, through which commands and operational information are exchanged with the host 10. Alternatively, the host may be indirectly coupled to the library controller through host interface 14 of the host, a host interface 122 of the storage drive 120 and then through library-drive interfaces (LDI) 124, 114 as is known to those skilled in the art. The library controller 110 is also coupled to one or more storage drives, represented in FIG. 1 by the single drive 120, through the library-drive interfaces (LDI) 114, 124 using an appropriate library-drive protocol. As used herein, the terms "library-drive interface" and "LDI" refer to any interface and/or protocol between the library controller 110 and the drive 120. The storage drive 120 is also coupled to the host 10 through a host interface 122 through which data and/or drive commands are exchanged. In the case where the host interface 122 is used as an indirect path to the library controller 110, library data and/or commands may also be exchanged. Not shown in FIG. 1 is a robotic accessor, which transports data storage media cartridges between storage cells and the drive 120.

The EKM 130 is coupled to the library controller 110 through another set of interfaces 116, 136 such as, for example, Ethernet ports employing TCP/IP, Fibre Channel, Fibre Channel over Ethernet, SCSI, iSCSI, SAS, SATA, Infiniband, USB, RS-232, etc. Interfaces 116, 136 may comprise a network or a wireless interface or network. Encryption keys are stored in the EKM 130 or in an external key store accessible to the EKM 130 (not shown).

In operation, the host 10 transmits a request to the library controller 110 to access a specified cartridge. The library controller 110 either directly controls, or transmits a command to, the accessor to transport the requested cartridge from a storage shelf to the drive 120. The accessor may have a reader with which to read or otherwise obtain an identifier from the cartridge to verify the identity of the cartridge, or the library controller 110 may use the drive 120 to read a cartridge identifier. The controller 110 compares the identifier to identifiers in a table and, if it finds a match, initiates communications with either the drive 120 or the EKM 130 to provide the encryption key(s) required for the cartridge from the EKM 130 to the drive 120. After the drive 120 has received the encryption key(s), it may then encrypt data being written to, or decrypt date being read from, the media within the specified cartridge in accordance with the key(s). Alternatively, there may be other triggers that cause the library and/or drive to obtain encryption key(s) from the EKM 130. For example, the library may be partitioned into multiple logical libraries and each logical library may have settings that dictate that encryption shall or shall not be performed for cartridges associated with that logical library. In another example, the drive may determine that a particular cartridge is encrypted and may request the encryption key(s) through the LDI 124.

However, the library 100 and/or the drive 120 may be obtained from different vendors by an OEM which integrates some or all of the components for sale to end users. For example, a library manufacturer may acquire OEM encryption-capable drives from another company. As previously noted, such OEM customers may have difficulty integrating the drives into the library in a quick and efficient manner, particularly when documentation may be difficult to obtain and each component introduces its own challenges which must be overcome. For example, for a library to support an encryption-capable drive it may be necessary to pass encryption keys between an EKM 130 and a drive 120. This may involve industry standard hardware and/or software interfaces such as Ethernet, SCSI, Fibre Channel, TCP/IP, etc. Alternatively, this may involve proprietary hardware and/or software interfaces. In any event, a large amount of work may be required to provide the necessary electrical and software interfaces between the various components in order to provide a transparent encryption solution. Alternatively, an end user may desire drive based encryption on a library that does not support it.

Figure 3:
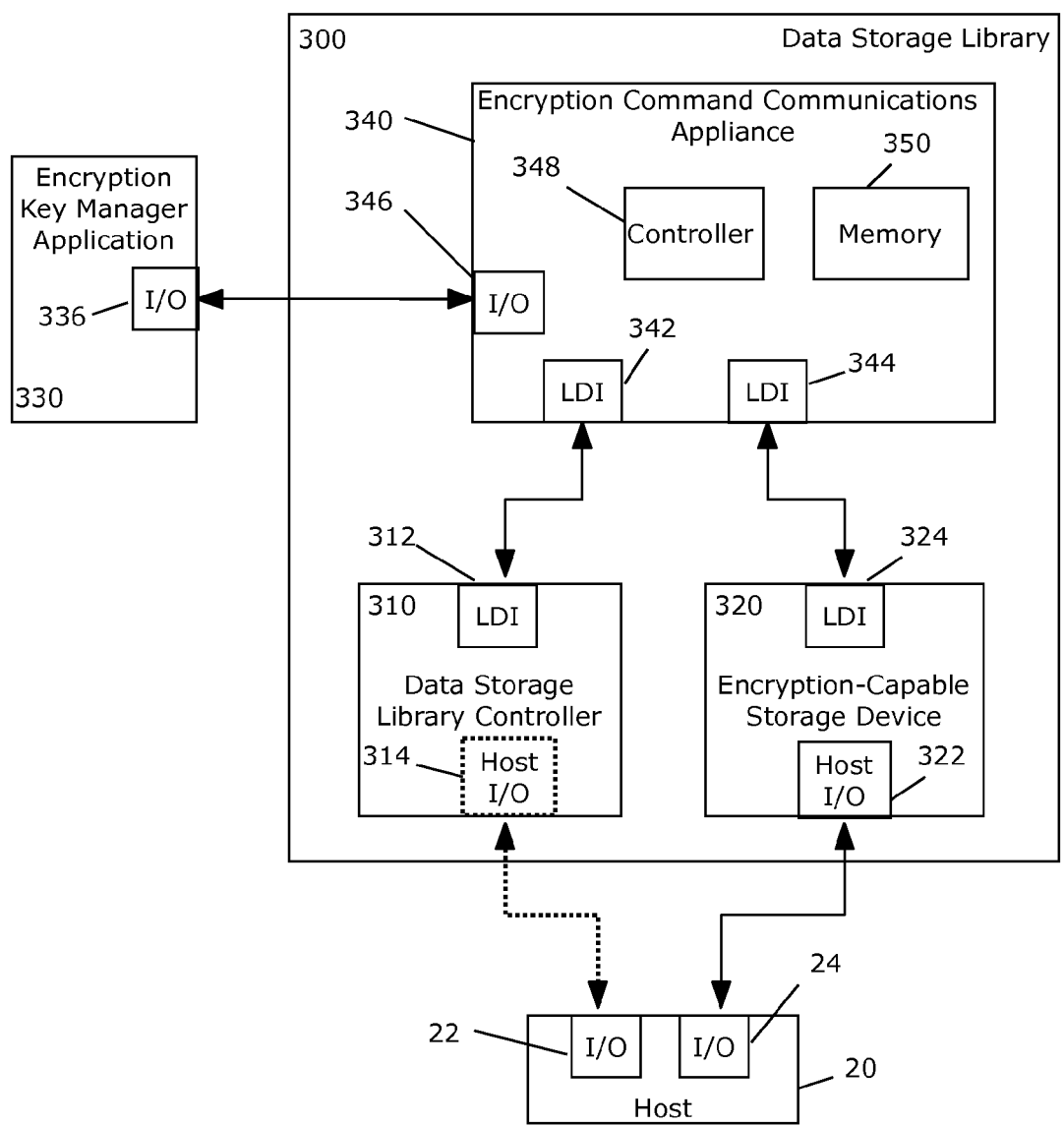
FIG. 3 is a block diagram of a data storage library in which an encryption command communications appliance may be incorporated.

Referring to FIG. 3, the present invention provides an appliance for providing transparent encryption to an automated data storage library 300. An encryption command communications appliance 340 is electrically inserted between a library controller 310 and an encryption-capable drive 320 using their existing LDI communication ports 312 and 324, respectively. The LDI ports 312, 324 may comprise an industry standard interface, may comprise a proprietary interface, or combinations thereof. In one embodiment, the LDI ports 312, 324 comprise the International Committee for Information Technology Standards SCSI T-10 ADI (Automation Drive Interface). The encryption command communications appliance 340 is coupled to an Encryption Key Manager 330 through interfaces 346, 336 respectively. Interfaces 346, 336 may comprise electrical interfaces such as Ethernet, Controller Area Network (CAN), SCSI, iSCSI, SAS, SATA, RS-232, etc. In addition, interfaces 346, 336 may comprise optical interfaces such as Fibre Channel, Fibre Channel over Ethernet, ESCON, FICON, etc. Still further, interfaces 346, 336 may comprise wireless interfaces such as 802.11, Wi-Fi, etc. In one embodiment, interfaces 346, 336 comprise an Ethernet interface employing a TCP/IP protocol. A TCP/IP protocol comprises one or more communication protocols defined by RFCs (Request For Comments) as is known to those of skill in the art. Examples include, but are not limited to, TCP, UDP, IP, FTP, HTTP, etc. In one embodiment, the EKM 330 and encryption appliance 340 are integrated together to eliminate the configuration, coupling, and setup that would otherwise be required if the two were independent components. In this embodiment, the EKM interface 346, 336 comprises an internal interface. The internal interface may comprise a physical interface between two or more hardware components (such as electrical, optical, or wireless hardware connections as described above), may comprise a logical interface between two or more software components (such as subroutines, functions, threads, tasks, processes, etc.), or may comprise combinations thereof. In one embodiment, the encryption appliance 340 provides data encryption transparent to the library controller 310. This is achieved by forwarding any commands or data received on the LDI 344 to the library controller 310, which is coupled to the LDI 342, when such commands or data are intended for the library controller 310. In addition, any commands or data received from the library controller 310 on the LDI 342 are forwarded to the encryption-capable drive 320 through the LDI 344. To complete the transparent encryption solution, the encryption appliance 340 intercepts and processes any commands or data related to encryption operations. As a result, the encryption appliance 340 may receive commands or data to/from an encryption key manager 330 and/or to/from the encryption capable drive 320 without forwarding those encryption commands and data to the library controller 310.

The communication on the I/O interfaces 336, 346 between the encryption key manager 330 and the encryption appliance 340, and the communication on the LDI interfaces 312, 342 between the library controller 310 and the encryption appliance 340, and the communication on the LDI interfaces 324, 344 between the encryption-capable drive 320 and the encryption appliance 340, and the communication on the I/O interfaces 24, 322 between the host 20 and the encryption-capable drive 320, and the communication on the optional I/O interfaces 22, 314 between the host 20 and the library controller 310 may all comprise commands, data, or combinations thereof. Herein, commands and data are used interchangeably to refer to either or both. In one embodiment, the encryption appliance 340 receives commands from the drive 320 over the LDI 344 and forwards those commands to the library controller 310 over the LDI 342. For example, the drive 320 may receive a library command from host 24 and may forward that command to library 310. In one embodiment, the encryption appliance 340 receives commands from the library controller 310 over the LDI 342 and forwards those commands to the drive 320 over the LDI 344. For example, the library controller 310 may query drive 320 for status related to the operation of the drive 320. In another example, the library controller 310 may instruct the drive 320 to perform a cartridge load/unload operation. In one embodiment, the encryption appliance 340 receives a request for one or more encryption keys from the drive 320 over the LDI 344, converts the LDI packets to TCP packets, and sends the request to the encryption key manager 330 over the I/O 346. The conversion from LDI packets to TCP packets may comprise treating the LDI packets as data within a TCP packet. One or more LDI packets may be combined into a single TCP packet or may be split into more than one TCP packet depending on the type of packet, size of data, etc. Alternatively, the conversion from LDI packets to TCP packets may comprise a more complex conversion of the data.

In another embodiment, the encryption appliance 340 receives one or more encryption keys from the encryption key manager 330 over the I/O 346, converts the TCP packets to LDI packets, and sends the key(s) to the drive 320 over the LDI 344. The conversion from TCP packets to LDI packets may comprise treating the TCP packets as data within an LDI packet. One or more TCP packets may be combined into a single LDI packet or may be split into more than one LDI packet depending on the type of packet, size of data, etc. Alternatively, the conversion from TCP packets to LDI packets may comprise a more complex conversion of the data. In another embodiment, the encryption appliance 340 intercepts library commands to provide selective encryption of certain data cartridges within the library. In this embodiment, the encryption appliance 340 may intercept Read Element Status (RES) data to establish a relationship between certain elements (cartridges) and their respective cartridge labels. The encryption appliance 340 may save the RES data in a table for later use. In another embodiment, the encryption appliance 340 intercepts cartridge Move Medium commands and cross references the cartridge element number from the Move Medium command with the cartridge element numbers in the RES table to determine the cartridge label associated with the cartridge being moved. The encryption appliance 340 then compares the label with a stored encryption policy to determine the encryption status of the cartridge. The policy may be used to determine whether the data on the cartridge should be encrypted, which key(s) should be used to encrypt or decrypt the data, etc. The policy may be configured as a result of a service assessment, as will be discussed. Alternatively, the policy may be configured through a web server, or some other user interface, associated with the encryption appliance 340.

Figure 2:
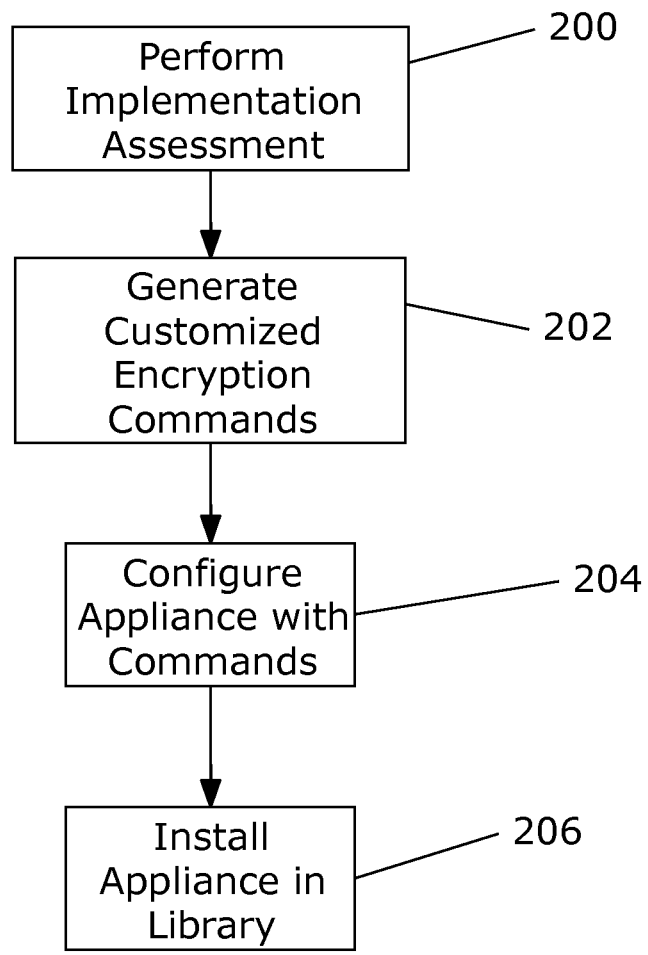
FIG. 2 is a flowchart of a method of the present invention.

The present invention provides a service and an appliance to permit customers, including end users and/or OEM customers, to quickly and efficiently integrate encryption-capable tape drives into data storage libraries. Herein, customer may refer to a company or individual that makes one or more components of a library. For example, a library manufacturer that makes libraries and drives. Another example would be a library manufacturer that makes libraries and integrates drives from another manufacturer. Another example would be a drive manufacturer. In addition, customer may refer to a company or individual that integrates multiple components without actually making any of them. For example, a services company that purchases different library components and sells the components as an integrated solution. Still further, customer may refer to an individual or company that purchases a library for their own use. Referring to the flowchart of FIG. 2 and the block diagram of FIG. 3, data encryption implementation assessment of a library 300 to be marketed by an OEM customer, or used by an end user customer, is first performed (step 200) by a qualified service engineer. The assessment, which is preferably performed under a non-disclosure agreement with the customer, provides an evaluation of the library 300. The evaluation may comprise an analysis of connectors and cables that are used to interconnect the drive 120 and the library controller 110 over the LDI 124, 114 (FIG. 1). This may be required to effectively insert the encryption appliance 340 between the library controller 310 and the drive 320 by way of LDI 342, 312 and LDI 344, 324 respectively (FIG. 3). For example, a particular library manufacturer may use drive canisters to more easily replace drives in the library. The drive canisters may use an interconnection cable (and subsequently may use different connectors) between the LDI connector on the drive brick and the LDI connector on the drive canister. In addition, there may be other cables and connections between the library controller 310 and the drive 320. As a result, the service engineer may determine the best way to break the existing LDI connection between the library controller 310 and the drive 320 and to rewire these connections to the encryption appliance 340.

The evaluation may also include a determination of how power will be supplied to the encryption appliance 340. The encryption appliance 340 may have its own power cable that must be supplied to a standard wall outlet. Alternatively, the encryption appliance 340 may tap into existing power of the library using special cables and/or connectors. This may be desired if there are no available standard outlets or if it is desired to control the appliance power through a library power switch or other control. In one embodiment, the encryption appliance 340 includes one or more user interfaces. The user interface may comprise an operator panel with a display and keys or buttons. Alternatively, the user interface may comprise a web user interface. Still further, the user interface may comprise a port that allows attachment of a computer or device for setup and configuration purposes. The user interface may be used to configure encryption settings, such as the type of encryption, the key length, when to encrypt, what to encrypt, other encryption policies, etc. In addition, the user interface may be used to configure encryption communication settings such as the IP address or host name of the EKM 330, any backup EKM, how to protect the communication (SSL, IPsec, etc.), etc. Still further, the user interface may be used to configure other settings such as how and when error reporting will be provided to the library controller 310 and/or the drive 320, the configuration and setup of other communication protocols (such as SNMP, SMI-S, email notifications, etc.), configuration and setup of the drive 320, etc.

The evaluation may also include an analysis of the various protocols used in the library 300, by the library controller 310, the storage device(s) 320, the host 20 and the EKM 330. The assessment may include an evaluation of the EKM 330 requirements, key store requirements, type and format for the encryption keys, encryption support for the various types of storage devices in the library, power requirements for the encryption command communications appliance, and a user interface to the encryption command communications appliance 340 through the existing library front panel display. The engineer can then provide cost and schedule estimates for the customer. The estimates may include the cost and schedule to configure the encryption command communications appliance 340, as well as the cost to purchase and install hardware, including the EKM 330, any required key stores (not shown), appliance 340, any associated interface cards, interface cables, power units, customized documentation, compliance documentation or certifications (EMC, UL, TUV, CSA, etc.), etc.

In response to the assessment, a set of customized encryption commands is optionally generated (step 202) for the customer with the necessary protocol translations which will enable the components 20, 310, 320, 330 to communicate with each other using their respective protocols. Such protocols may include, without limitation, TCP/IP, SNP, LDI, ADI, Ethernet, Fibre Channel, Fibre Channel over Ethernet, SCSI, iSCSI, SAS, SATA, Infiniband, wireless, etc. This step is optional because an end user customer may not have a need for any customization of encryption commands, or the user interface may provide such customization. On the other hand, an OEM customer may desire such a service.

Figure 4:
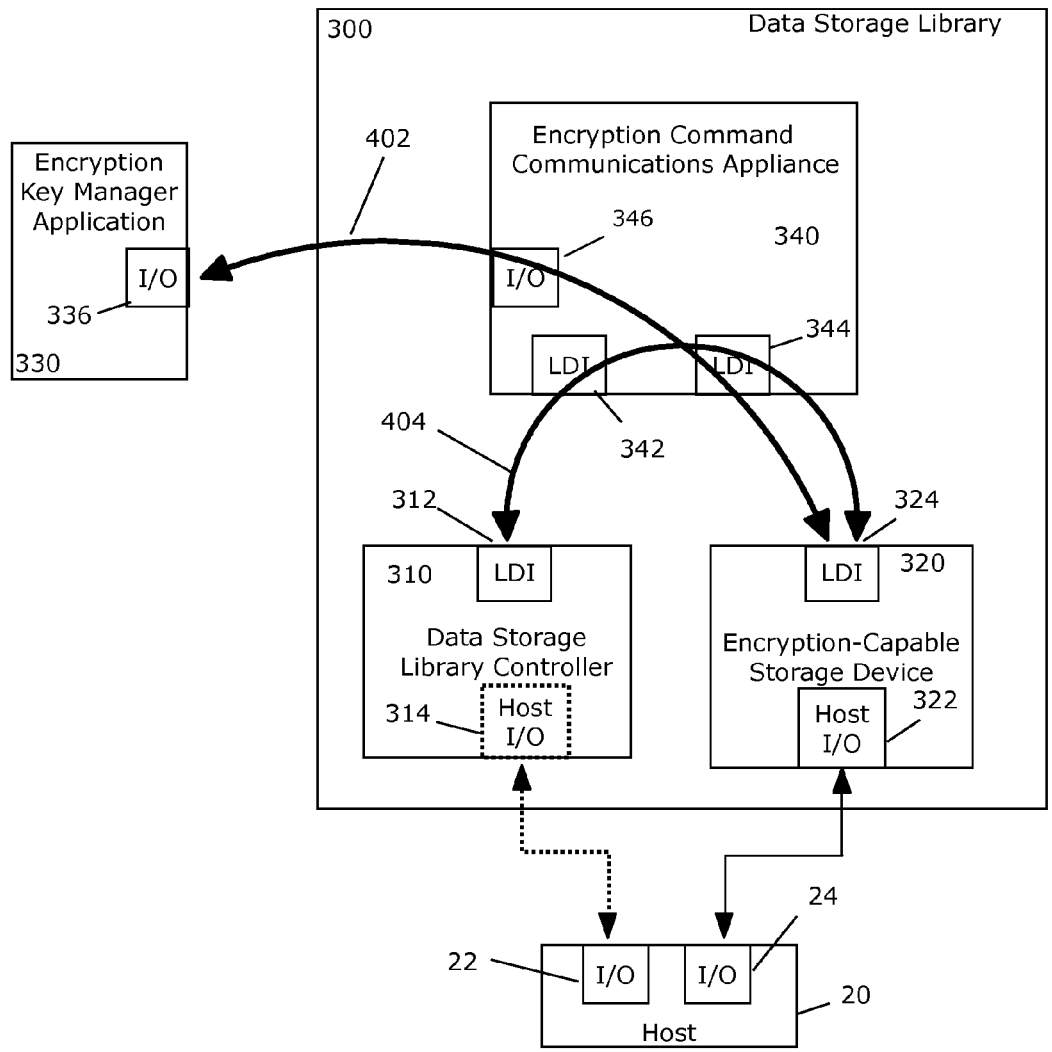
FIG. 4 is a block diagram of the data storage library of FIG. 3 in which communications paths between the encryption command communications appliance and the storage device and between the library controller and the storage device have been highlighted.

After the optional customized command set is generated, an encryption command communications appliance 340 is configured with the generated customized configuration commands (step 204) and installed in (or coupled to) the library 300 (step 206) between the library controller 310 and the storage device 320 and between the EKM 330 and the storage device 320. In this configuration, the appliance 340 intercepts and forwards encryption key requests from the storage device 320 to the EKM 330 as well as passes normal communications between the library controller 310 and the storage device 320. Consequently, as illustrated by the heavy arrows in FIG. 4, the EKM 330 and the storage device 320 will be able to communicate with each other (arrow 402) in a manner which is transparent to the library controller 310 regardless of the protocols used by the components. Similarly, the library controller 310 and the storage device 320 will be able to communicate with each other (arrow 404) as if the encryption command communications appliance 340 was not present (i.e. the encryption command communications appliance 340 may be transparent to the library controller 310). The encryption command communications appliance 340 eliminates the need for the library controller 310 to implement the software and hardware required for obtaining encryption keys for the storage device 320. This is advantageous for an end user customer that owns a library which does not support transparent encryption. Any existing library that uses certain encryption capable drives could be upgraded. This is also advantageous for an OEM customer that wants to provide a transparent encryption solution to end user customers without the overhead of development, certification, and test.

The customer may be charged a fee for any or all of the provided services, including operation of the data storage library, performing the implementation assessment; generating the set of customizations, installing the encryption command communications appliance in the data storage library, and configuring the encryption command communications appliance.

Figure 5:
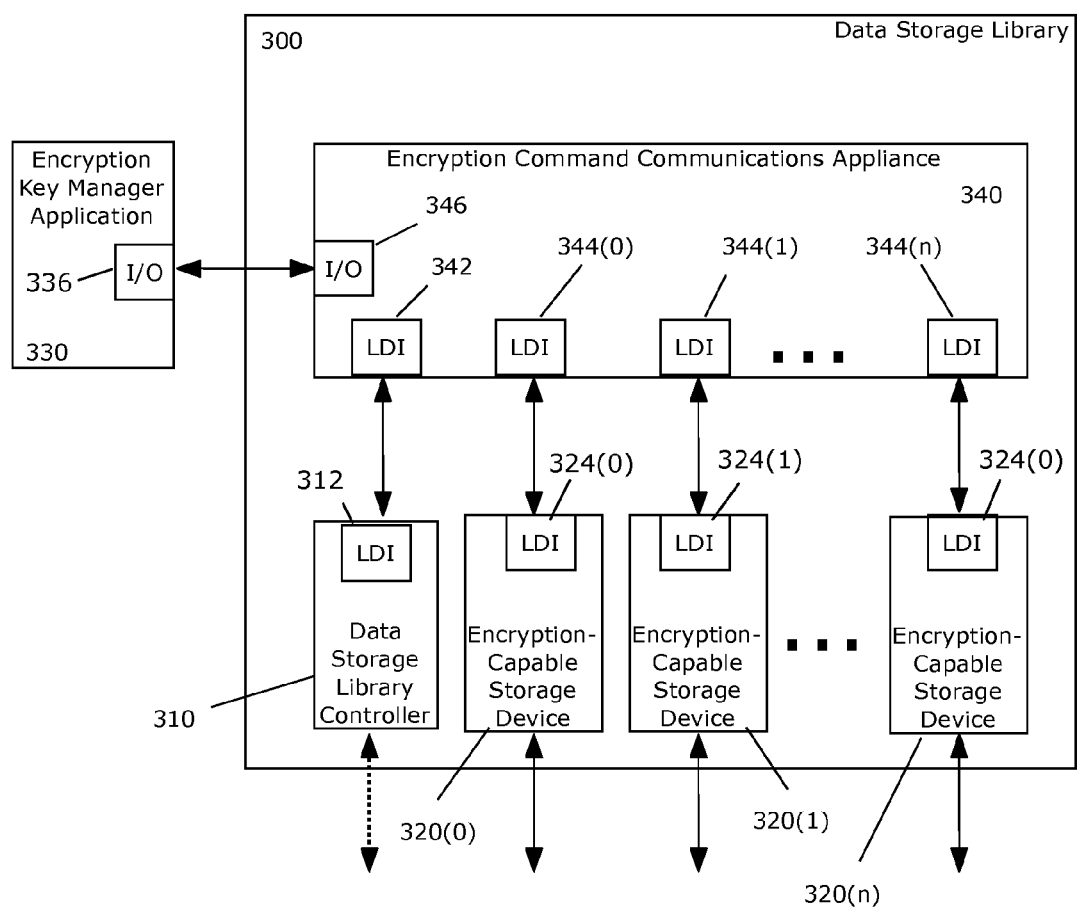
FIG. 5 is a block diagram of an embodiment of the encryption command communications appliance having a plurality of library/drive interfaces coupled to a like plurality of storage drives.

In the embodiment of FIG. 3, the encryption command communications appliance 340 includes interfaces 342, 344, 346 with the library controller 310, storage device 320 and EKM 330, respectively. The interfaces 342, 344 with the controller 310 and storage device 320 may be library-drive interfaces (LDI) coupled with compatible LDI interfaces 312, 324 in the controller 310 and storage device 320, respectively. The interface 346 may be any interface compatible with an interface 336 of the EKM 330, such as an Ethernet, SCSI, iSCSI, SAS, SATA, Fibre-Channel, Fibre-Channel-over-Ethernet, Infiniband, USB, etc. These interfaces may comprise direct connections, networks, or wireless interfaces, or combinations thereof. As in FIG. 3, the library controller 310 and storage device 320 may also include host I/O interfaces 314, 322 coupled to compatible interfaces 22, 24 in the host 20 (or independent hosts). Because many libraries have more than one storage device installed, multiple storage devices 320(0), 320(1), . . . 320(n), with interfaces 324(0), 324(1), . . . 324(n) respectively, may be accommodated by configuring the appliance 340 with multiple interfaces 344(0), 344(1), . . . , 344(n) as shown in FIG. 5. In addition, library controller 310 may have corresponding interfaces for each of the drives 320. In this case, encryption appliance 340 may also have multiple interfaces 342(0), 342(1), . . . , 342(n) for coupling to the interfaces of library controller 310 (not shown). In other words, for each interface 344(0-n), there may be a corresponding interface 342(0-n), and each of the interface 342(0-n) may be coupled to a library controller interface (not shown).

Referring to FIG. 3, the appliance 340 also includes a controller 348. The appliance controller 348 may comprise a processor, computer, workstation, discrete logic, FPGA, ASIC, etc. The appliance controller 348 receives commands from the drive 320 (over the LDI 344), and may forward some of the commands to the library controller 310 (over the LDI 342). For example, in order to be transparent to the library controller 310, the encryption appliance 340 may simply pass all communication from the drive 320 (the LDI 344) that is intended for the library controller 310 (through the LDI 342). Alternatively, the encryption appliance 340 may alter some or all of the commands before forwarding them to the library controller 310. For example, the library 300 may not support a particular drive model or manufacturer. The encryption appliance 340 may alter the communication to make the drive 320 look and act like a drive that the library 300 does support. This may involve the spoofing of certain commands and/or protocols or it may comprise a complete restructuring of the commands and/or protocols.

The appliance controller 348 intercepts some commands from the drive 320 (through the LDI 344), and forwards those commands to the EKM 330 (through the I/O 346). By intercepting certain commands and forwarding them to the EKM 330, the appliance controller 348 enables encryption commands to be handled in a manner which is transparent to the library controller 310. The forwarding may comprise a redirection of the commands. For example, if the I/O 346 comprises the same hardware and/or software protocol as the LDI 344 then the encryption appliance 340 may only need to forward the commands from one port to another. Alternatively, the forwarding may be more complex. For example, if the I/O 346 comprises a different hardware and/or software protocol than the LDI 344, then it may be necessary for the encryption appliance to modify the commands. This modification may comprise sending the same data with a different wrapper or protocol structure, or may comprise a complete restructuring of the data from one protocol to another. In another example, the encryption protocol between EKM 330 and drive 320 may not be compatible. In this case, encryption appliance may provide the necessary translation or conversion to allow the two to effectively communicate and pass key requests and keys.

The use of different hardware and/or software protocols for the LDI 344 and the I/O 346 provides the advantage using of existing wiring commonly found in a data center. For example, it may be most economical to use an Ethernet network for the I/O 346 and a proprietary connection for the LDI 344. The appliance controller 348 receives commands from the EKM 330 (through the I/O 346) and forwards them to the drive 320 (through the LDI 344). The appliance controller 348 also receives commands from the library controller 310 (through the LDI 342) and forwards them to the drive 320 (through the LDI 344). The appliance controller 348 may also direct the operation of a user interface, as was previously discussed. The encryption appliance 340 may also include a memory 350 for storing the instructions executed by the appliance controller 348, for holding configuration settings, for holding encryption policies, etc.

Figure 6:
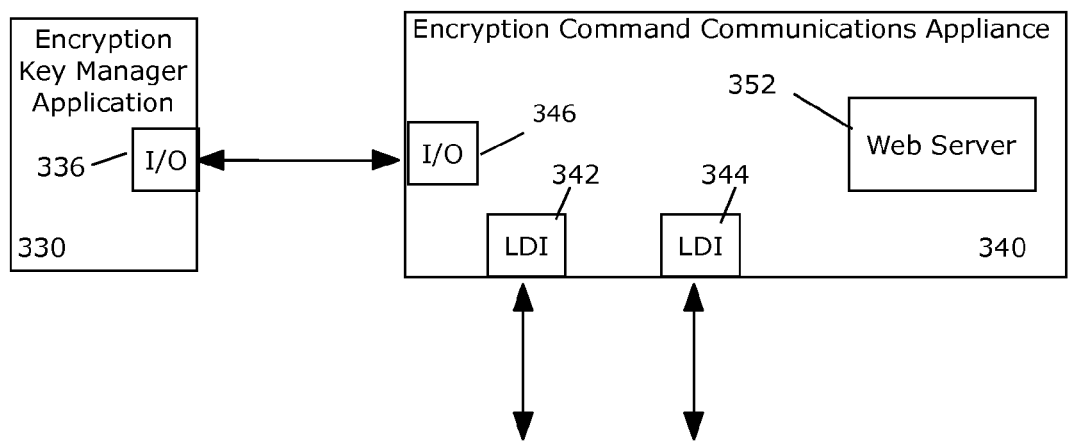
FIG. 6 is a block diagram of the encryption command communications appliance in which a web server has been incorporated.

Although the encryption appliance 340 may be configured by the manufacturer before being installed, or by a field technician as part of installation, in the embodiment of FIG. 6, the encryption appliance 340 includes a user interface, such as a web server 352 which enables the OEM customer or end-user customer to configure or re-configure the appliance 340 after the encryption appliance 340 has been installed in the library. If the library controller 310 comprises a web user interface, then a small change may be made to the library firmware to link the library controller 310 web user interface to the encryption appliance web server 352. This has the advantage of providing a single seamless web user interface to the customer.

In a variation of the embodiment of FIG. 3, the encryption appliance 340 may be programmed to support configuration commands from the library controller 310 through interface 342, for example. Additional programming or firmware is incorporated into the library controller 310; however, such programming or firmware is less complex than that which is currently required for the library controller 110 to pass encryption keys and handle error recovery routines associated with the EKM 130 (FIG. 1).

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of storage media actually used to carry out the distribution. Examples of computer readable storage media include recordable-type media such as a floppy disk, a hard disk drive, a random access memory, CDs, DVDs, HD-DVDs, and BDs, Compact Flash, Secure Digital media, Solid-State Drive, etc.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for providing data encryption for a data storage library or a method for deploying computing infrastructure comprising integrating computer readable code into a computing system for providing data encryption for a data storage library.

What is claimed is:

1. An encryption command communications appliance for an automated data storage library, the appliance comprising:
   a first interface coupled with an encryption key manager (EKM);
   a first library-drive interface (LDI) coupled with a data storage library controller, the library controller comprising a first host interface coupled to a host device;
   a second LDI coupled with an encryption-capable data storage device, the encryption-capable storage device comprising a second host interface coupled to the host device and having no interface coupled to the library controller; and
   a controller coupled to the first interface and the first second LDIs to permit the encryption-capable data storage device to communicate with the EKM without communicating with the library controller;
   the appliance being operable to:
      intercept encryption commands and data from the encryption-capable data storage device and forward the requests to the EKM through the second LDI the first interface;
      intercept encryption commands and data from the EKM and forward the requests to the encryption-capable data storage device through the first interface and the second LDI; and
      forward communications between the library controller and the encryption-capable data storage device through first and second LDIs.

2. The encryption command communications appliance of claim 1, wherein the appliance is operable to forward the encryption commands to the EKM using protocol translations to permit the encryption commands to be converted among protocols used by the encryption-capable storage device and the EKM.

3. The encryption command communications appliance of claim 1, wherein the second LDI comprises a plurality of LDIs with a like plurality of encryption-capable data storage drives.

4. The encryption command communications appliance of claim 3, wherein the first LDI comprises a plurality of LDIs equal to the number of second LDIs.

5. The encryption command communications appliance of claim 1, further comprising a web server accessible by a customer and through which the appliance is configurable by the customer.

6. The encryption command communications appliance of claim 1, wherein the second LDI comprises a SCSI T-10 Automation Drive Interface.

7. The encryption command communications appliance of claim 1, wherein the first interface comprises an Ethernet interface employing one or more TCP/IP protocols.

8. The encryption command communications appliance of claim 1, further comprising configuration data to define an encryption policy associated with a label of at least one cartridge, the encryption command communications appliance further operable to monitor results of a Read Element Status command, store the results of the command in a table to cross reference the cartridge label with a corresponding cartridge element number, monitor the results of a Move Medium command, cross reference the cartridge element number from the Move Medium command in the table to find the cartridge label associated with the Move Medium command, and use the cartridge label and the configuration data to determine the encryption policy for the cartridge.

9. The encryption command communications appliance of claim 8, wherein the encryption policy comprises a decision to encrypt data based on the value of the cartridge label.

10. The encryption command communications appliance of claim 1, wherein the EKM is integrated with the encryption command communications appliance and wherein the first interface comprises an internal interface.

11. A data storage library, comprising:
- a library controller having a first host interface coupled to a host device;
- an encryption-capable storage device having a second host interface coupled to the host device an having no interface coupled to the library controller; and
- an encryption command communications appliance, comprising:
  - a first interface coupled to an encryption key manager (EKM);
  - a second interface coupled to the library controller;
  - a third interface coupled to the encryption-capable storage device; and
  - an appliance controller coupled to the first, second, and third interfaces to permit the encryption-capable storage device to communicate with the EKM without communicating with the library controller,
- the appliance controller being operable to:
  - intercept encryption commands and data from the encryption-capable data storage device and forward the requests to the EKM through the third and first interfaces;
  - intercept encryption commands and data from the EKM and forward the requests to the encryption-capable data storage device through the first and third interfaces; and
  - forward communications between the library controller and the encryption-capable data storage device through the second and third interfaces.

12. The data storage library of claim 11, wherein the encryption command communications appliance is operable to forward the encryption commands to the EKM using protocol translations to permit the encryption commands to be converted among protocols used by the encryption-capable storage device and the EKM.

13. The data storage library of claim 11, wherein the first interface comprises an Ethernet interface employing one or more TCP/IP protocols.

14. The data storage library of claim 11, further comprising a plurality of encryption-capable data storage drives operatively coupled to the library controller.

15. The data storage library of claim 11, wherein the encryption command communications appliance further comprises configuration data to define an encryption policy associated with a label of at least one cartridge, the appliance further operable to monitor results of a Read Element Status command, store the results of the command in a table to cross reference the cartridge label with a corresponding cartridge element number, monitor the results of a Move Medium command, cross reference the cartridge element number from the Move Medium command in the table to find the cartridge label associated with the Move Medium command, and use the cartridge label and the configuration data to determine the encryption policy for the cartridge.

16. The data storage library of claim 11, wherein the EKM is integrated with the encryption command communications appliance and wherein the first interface comprises an internal interface.

* * * * *